(12) United States Patent
Taylor

(10) Patent No.: US 11,503,378 B2
(45) Date of Patent: *Nov. 15, 2022

(54) MEDIA SHARING AND COMMUNICATION SYSTEM

(71) Applicant: David A. Taylor, Sterling Heights, MI (US)

(72) Inventor: David A. Taylor, Sterling Heights, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,380

(22) Filed: Feb. 12, 2021

(65) Prior Publication Data

US 2021/0168457 A1 Jun. 3, 2021

Related U.S. Application Data

(63) Continuation-in-part of application No. 17/108,306, filed on Dec. 1, 2020, which is a continuation-in-part of application No. 17/087,794, filed on Nov. 3, 2020, which is a continuation-in-part of application No. 16/923,699, filed on Jul. 8, 2020, which is a continuation-in-part of application No. 16/882,512, (Continued)

(51) Int. Cl.
| | |
|---|---|
| *H04N 21/4788* | (2011.01) |
| *H04N 21/478* | (2011.01) |
| *H04N 21/44* | (2011.01) |
| *H04L 51/10* | (2022.01) |
| *G06Q 30/06* | (2012.01) |

(52) U.S. Cl.
CPC ..... *H04N 21/4788* (2013.01); *G06Q 30/0643* (2013.01); *H04L 51/10* (2013.01); *H04N 21/4781* (2013.01); *H04N 21/47815* (2013.01)

(58) Field of Classification Search
None
See application file for complete search history.

(56) References Cited

U.S. PATENT DOCUMENTS

| | | |
|---|---|---|
| 7,643,564 B2 | 1/2010 | Sheynman et al. |
| 9,195,388 B2 | 11/2015 | Shepherd |

(Continued)

OTHER PUBLICATIONS

Team Android, 'Android Secret Dial Codes List', "http://www.teamandroid.com/2012/09/02/android-secret-dial-codes/" Sep. 2, 2012, pp. 1-7.

*Primary Examiner* — Junior O Mendoza
(74) *Attorney, Agent, or Firm* — Kenneth Kohn

(57) ABSTRACT

A media sharing and communication system, including a recording mechanism that records a desired portion of media upon activation by a first individual user, a first user transmitter/receiver that transmits the portion of media and a message generated by the first individual user regarding the portion of media to a second individual user and is capable of transmitting a message to a second individual user, a confirmation mechanism that confirms that the second individual user is authorized to view the portion of media, a notification mechanism that notifies the first individual user if the second individual user is not authorized to receive the portion of media, a second user transmitter/receiver that receives the portion of media and voice message upon authorization of the second individual user, a search mechanism, and a video recording mechanism, an online betting module, and an online food ordering module.

27 Claims, 5 Drawing Sheets

Related U.S. Application Data filed on May 24, 2020, which is a continuation-in-part of application No. 16/832,370, filed on Mar. 27, 2020, which is a continuation-in-part of application No. 16/683,347, filed on Nov. 14, 2019, now Pat. No. 10,715,872, which is a continuation-in-part of application No. 16/032,612, filed on Jul. 11, 2018, now Pat. No. 10,694,255, which is a continuation-in-part of application No. 13/937,001, filed on Jul. 8, 2013, now Pat. No. 10,368,122, and application No. 61/773,518, Mar. 6, 2013.

(56) References Cited

U.S. PATENT DOCUMENTS

| | | | |
|---|---|---|---|
| 10,368,122 B2 | 7/2019 | Taylor | |
| 10,694,255 B2 | 6/2020 | Taylor | |
| 10,715,872 B2 | 7/2020 | Taylor | |
| 2003/0088872 A1 | 5/2003 | Maissel et al. | |
| 2005/0015809 A1 | 1/2005 | Boys | |
| 2005/0028199 A1 | 2/2005 | Borden, IV | |
| 2005/0094031 A1 | 5/2005 | Tecot et al. | |
| 2005/0172319 A1 | 8/2005 | Reichardt | |
| 2007/0217436 A1 | 9/2007 | Markley et al. | |
| 2007/0220575 A1 | 9/2007 | Cooper et al. | |
| 2007/0245243 A1 | 10/2007 | Lanza | |
| 2007/0283380 A1 | 12/2007 | Aoki et al. | |
| 2007/0288970 A1 | 12/2007 | Tedenvall | |
| 2007/0300263 A1 | 12/2007 | Barton | |
| 2008/0120325 A1 | 5/2008 | Davis | |
| 2008/0228733 A1 | 9/2008 | Davis et al. | |
| 2009/0070845 A1 | 3/2009 | White et al. | |
| 2009/0089838 A1* | 4/2009 | Pino, Jr. | H04N 21/4758 725/40 |
| 2009/0132717 A1 | 5/2009 | Maes | |
| 2009/0150947 A1* | 6/2009 | Soderstrom | H04N 21/4788 725/93 |
| 2009/0158325 A1 | 6/2009 | Johnson | |
| 2009/0217332 A1 | 8/2009 | Hindle et al. | |
| 2009/0228938 A1 | 9/2009 | White et al. | |
| 2009/0276805 A1* | 11/2009 | Andrews, II | H04N 21/435 725/38 |
| 2010/0011390 A1 | 1/2010 | Coles et al. | |
| 2010/0071014 A1 | 3/2010 | Brown et al. | |
| 2010/0095337 A1 | 4/2010 | Dua | |
| 2010/0100729 A1 | 4/2010 | Read et al. | |
| 2010/0146567 A1 | 6/2010 | Mehta et al. | |
| 2010/0179867 A1* | 7/2010 | Hughes | G06Q 30/0269 705/14.5 |
| 2010/0242074 A1 | 9/2010 | Rouse | |
| 2010/0306815 A1 | 12/2010 | Emerson et al. | |
| 2011/0072078 A1 | 3/2011 | Chai | |
| 2011/0075841 A1 | 3/2011 | Chen | |
| 2011/0126258 A1 | 5/2011 | Emerson et al. | |
| 2011/0131604 A1 | 6/2011 | Van Hoff et al. | |
| 2011/0134026 A1 | 6/2011 | Kang | |
| 2011/0179439 A1 | 7/2011 | Elbarky | |
| 2011/0296466 A1 | 12/2011 | Nguyen et al. | |
| 2012/0092444 A1 | 4/2012 | Mackie et al. | |
| 2012/0216121 A1* | 8/2012 | Lin | H04N 21/234327 709/219 |
| 2012/0227073 A1 | 9/2012 | Hosein | |
| 2012/0311633 A1 | 12/2012 | Mandrekar | |
| 2013/0247101 A1* | 9/2013 | Uchida | H04N 21/4223 725/40 |
| 2013/0305275 A1 | 11/2013 | Emerson | |
| 2013/0346867 A1 | 12/2013 | Woods et al. | |
| 2014/0068692 A1 | 3/2014 | Archibong et al. | |
| 2014/0082645 A1 | 3/2014 | Stern et al. | |
| 2014/0259062 A1* | 9/2014 | Taylor | H04N 21/4334 725/38 |
| 2014/0282638 A1* | 9/2014 | Pequignot | H04N 21/47815 725/5 |
| 2014/0310752 A1* | 10/2014 | Lam | H04N 21/4788 725/60 |
| 2015/0139615 A1* | 5/2015 | Hill | G11B 27/34 386/285 |
| 2015/0263915 A1 | 9/2015 | Berezecki | |
| 2016/0165265 A1 | 6/2016 | Archibong | |
| 2018/0260843 A1* | 9/2018 | Hiranandani | G06K 9/6274 |
| 2018/0324496 A1 | 11/2018 | Taylor | |
| 2019/0018572 A1* | 1/2019 | Jaini | H04N 21/47202 |
| 2020/0228878 A1 | 7/2020 | Taylor | |
| 2020/0288019 A1 | 9/2020 | Taylor | |
| 2021/0058350 A1* | 2/2021 | Taylor | H04L 51/48 |
| 2021/0084377 A1* | 3/2021 | Taylor | H04N 21/4532 |
| 2021/0274260 A1* | 9/2021 | Taylor | G06Q 30/0633 |

* cited by examiner

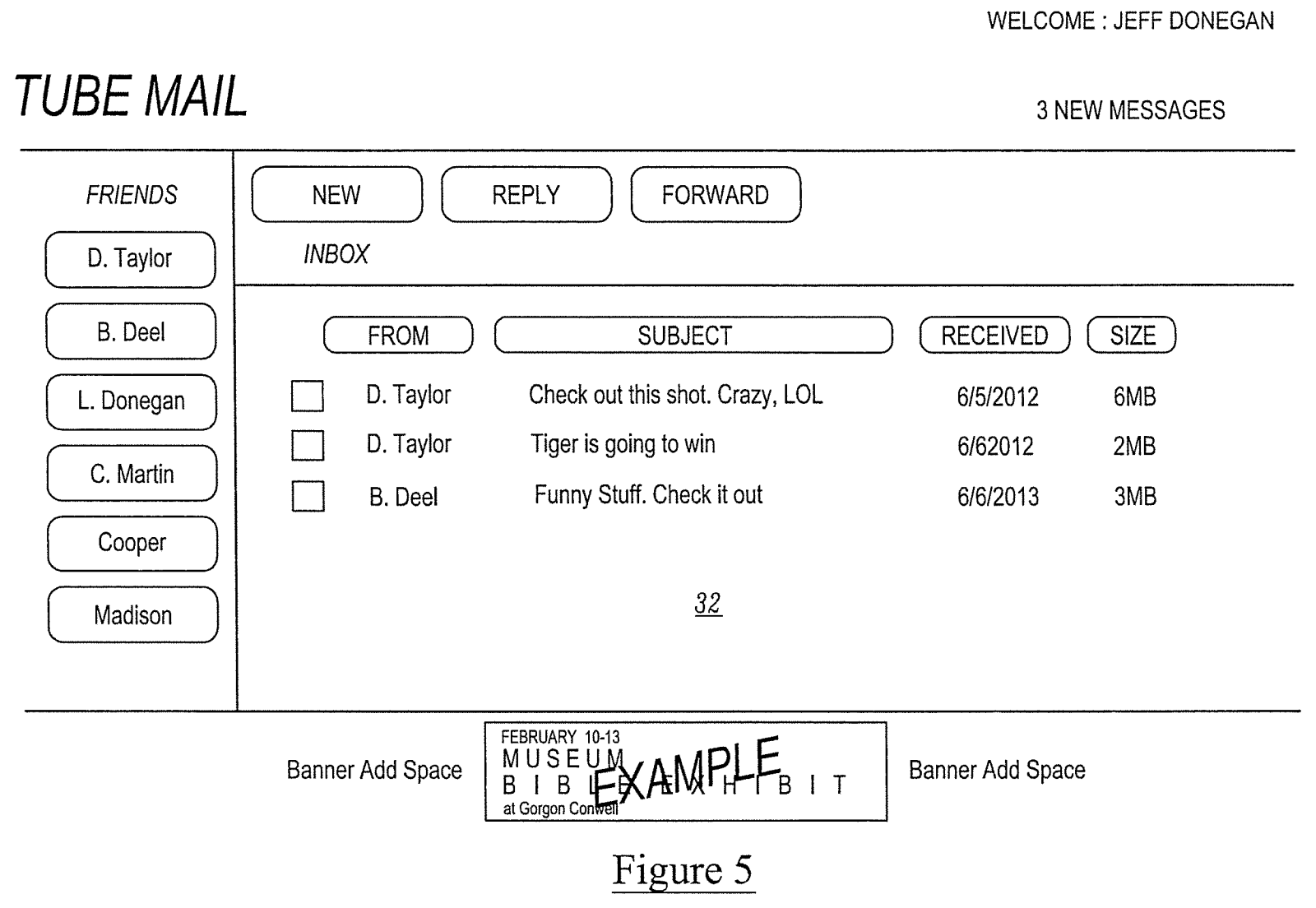

TUBE MAIL

WELCOME : JEFF DONEGAN

3 NEW MESSAGES

*FRIENDS*

- D. Taylor
- B. Deel
- L. Donegan
- C. Martin
- Cooper
- Madison

[ NEW ]  [ REPLY ]  [ FORWARD ]

*INBOX*

| FROM | SUBJECT | RECEIVED | SIZE |
|---|---|---|---|
| ☐ D. Taylor | Check out this shot. Crazy, LOL | 6/5/2012 | 6MB |
| ☐ D. Taylor | Tiger is going to win | 6/62012 | 2MB |
| ☐ B. Deel | Funny Stuff. Check it out | 6/6/2013 | 3MB |

32

FEBRUARY 10-13
MUSEUM
BIB EXHIBIT
at Gorgon Conwell

Banner Add Space

Banner Add Space

Figure 5

MEDIA SHARING AND COMMUNICATION SYSTEM

BACKGROUND OF THE INVENTION

1. Technical Field

The present invention relates to generally to media sharing and communication systems and methods of providing the same.

2. Background Art

Individuals having common bonds, both men and women, congregate together to watch events such as sports, theater, or otherwise. In one particular aspect, it is common for individuals to watch television programming including movies, sports, politics, or otherwise. This may occur in a public setting, such as bars, or in a private setting, such as one's home. During these programming events, individuals engage in discussions, exchange of ideas or beliefs, cheering or even badgering one another.

With the expansion in relationships between individuals, it is not always possible for individuals to participate in viewing events or programming together. This is particularly the case after individuals separate over time, such as after military service, college, or otherwise. However, recently it has become more common for individuals to maintain long distance relationships with one another. To this extent, various internet service providers have offered networking and communication systems between individuals. They provide the ability to send public and private messages to others in their networking group. They also provide the ability to share profiles and preferences with one another so as to exchange information. Examples of such networking systems include FACEBOOK®, LINKEDIN®, TWITTER®, or otherwise.

However, while these and other networking means have provided some means for individuals to maintain contact, they do not effectively replace the ability for individuals to interact with one another, particularly when it comes to events and more particularly with television programming.

In view of the foregoing, there is a need for systems and methods to allow individuals to continue to enjoy events and programming together, without having to be at the same location. This allows for expanded networking in different aspects than before.

SUMMARY OF THE INVENTION

The present invention provides for a media sharing and communication system, including a recording mechanism that records a desired portion of media upon activation by a first individual user who is not a content provider, the portion of media being less than a full media episode, a friend request mechanism for sending and receiving friend requests between users to be approved to receive and share media and wherein the friend request mechanism suggests friends who have similar interests of the first individual user, and wherein the friends are searchable by information chosen from the group consisting of name, user name, gamer tag, telephone, address, and email, a first user transmitter/receiver included in a first user system that transmits the portion of media and a message generated by the first individual user regarding the portion of media to a second individual user who is not a content provider, the first user system including a first user interface having an input device and screen view that is generated by software stored on a memory device of the first user transmitter/receiver, the first user system including a user profile generator interface and a store section for shopping for products and listing products for sale, wherein the store section includes software that recognizes and tags items available to purchase in the media and a mechanism for virtually trying on products, a confirmation mechanism that confirms that the second individual user is authorized to view the portion of media and a notification mechanism that notifies the first individual user if the second individual user is not authorized to receive the portion of media and notifies the second individual user that the portion of media cannot be received due to programming configuration subscribed to by the second individual user, a second user transmitter/receiver included in a second user system that receives the portion of media upon authorization of the second individual user; the second user system including a second user interface having an input device and screen view that is generated by software stored on a memory device of the second user transmitter/receiver, the second user system including a user profile generator interface and a store section for shopping for products and listing products for sale, wherein the store section includes software that recognizes and tags items available to purchase in the media and a mechanism for virtually trying on products, a search mechanism that allows the first individual user and second individual user to search by keywords for media and products used in media, a video recording mechanism that allows the first individual user to record a video of themselves and share the video with the second individual user, an online betting module that allows the first individual user to place bets, and an online food ordering module that allows the first individual user to order food, wherein the online food ordering module includes software that recognizes and tags food available to order in the media.

The present invention also provides for method of sharing media by a first individual user recording a portion of media and recording a message of video, text, voice, emojis, images, and combinations thereof with a first user interface on a first user system, transmitting the portion of media and message to a second individual user if the second individual user is authorized to view the portion of media, the second individual user viewing the portion of media and message with a second user interface on a second user system, the first individual user placing a bet on a sporting event or online game with an online betting module on the first user interface, software in a store section in the first user interface recognizing and tagging items available to purchase in the media, the first individual user shopping for available products from the store section, software in an online food ordering module in the first user interface recognizing and tagging food available to order in the media, and the first individual user ordering food with the online food ordering module on the first user interface.

The present invention also provides for a media sharing and communication system including a recording mechanism that records a desired portion of media upon activation by a first individual user who is not a content provider, the portion of media being less than a full media episode, a friend request mechanism for sending and receiving friend requests between users to be approved to receive and share media and wherein the friend request mechanism suggests friends who have similar interests of the first individual user and wherein the friends are searchable by information of name, user name, gamer tag, telephone, address, and email, a first user transmitter/receiver included in a first user system that transmits the portion of media and a message generated by the first individual user regarding the portion of media to a group of individual users who are not content providers, the first user system including a first user interface having an input device and screen view that is generated by software stored on a memory device of the first user transmitter/receiver, the first user system including a user profile generator interface and a store section for shopping for products and listing products for sale, wherein the store section includes software that recognizes and tags items available to purchase in the media and a mechanism for virtually trying on products, a confirmation mechanism that confirms that the group of individual users are authorized to view the portion of media and a notification mechanism that notifies the first individual user if any one of the group of individual users is not authorized to receive the portion of media and notifies the one of the group of individual users that the portion of media cannot be received due to programming configuration subscribed to by the one of the group of individual users, a plurality of user transmitter/receivers included in a plurality of user systems that receive the portion of media upon authorization of the group of individual users; the plurality of user systems including a plurality of user interfaces having an input device and screen view that is generated by software stored on a memory device of the plurality of user transmitter/receivers, the plurality of user systems including a user profile generator interface and a store section for shopping for products and listing products for sale, wherein the store section includes software that recognizes and tags items available to purchase in the media and a mechanism for virtually trying on products, a search mechanism that allows the first individual user and second individual user to search by keywords for media and products used in media, a video recording mechanism that allows the first individual user to record a video of themselves and share the video with the plurality of individual users, an online betting module that allows the first individual user to place bets, and an online food ordering module that allows the first individual user to order food, wherein the online food ordering module includes software that recognizes and tags food available to order in the media.

The present invention also provides for a shopping interface for purchasing items on media, including the user system having the user interface displaying items for purchase and including software that recognizes and tags items available to purchase in the media, such that when the media is paused, items for purchase pop up and are displayed on the user interface allowing said user to select an item to purchase, the user system storing user payment and address information on non-transitory computer readable media, and the user interface including a mechanism for virtually trying on products.

The present invention also provides for a method of shopping on media, including the steps of a user playing media on the user interface of the user system, software recognizing and tagging items available to purchase in the media, the user pausing the media, displaying items for purchase, the user selecting an item, the user virtually trying on the item, and the user purchasing the item with stored user payment and address information on non-transitory computer readable media of the user system.

DESCRIPTION OF THE DRAWINGS

Other advantages of the present invention are readily appreciated as the same becomes better understood by reference to the following detailed description when considered in connection with the accompanying drawings wherein:

FIG. 5 illustrates a screen-shot of an exemplary user interface according to the teachings of the present invention.

DETAILED DESCRIPTION OF THE INVENTION

The present invention generally provides systems and methods for sharing and exchanging media between individuals with a media sharing and communication system 10, shown in the FIGURES. The exchange of media can be based on known interests of others.

"Individual" as defined herein, refers to an individual user of media, and not a media content provider or company.

"Media" as used herein, refers preferably to a short portion of media, or a clip i.e. less than a whole video, movie, television show, song, commercial, etc. However, full portions of media can also be shared. Also, screenshots of media can be shared. The portion of media can be any length of time, such as 5 seconds, 10 seconds, 25 seconds, 1 minute, 2 minutes, 5 minutes, or other lengths. Some media are already divided into blocks defining particular scenes, such as in 10 second blocks or other lengths. The preset blocks of media can also be shared, and do not necessarily need to be recorded to be shared.

The media can also be an online game, and users can record portions of the game they are playing, allowing other users to see highlights, records, achievements, or in general plays they have made. The online game can be played on systems such as Xbox, PlayStation, Nintendo DS, or other web-based games through the Internet. The media, whether a game or other type, can also be on a virtual reality platform.

Advancements through the features of the present invention provide a TUBEMAIL™, TUBESHARE™, YOUSHARE™, communication system that allows individual users, who share the same cable or satellite provider, the ability to record and share portions or full episodes of sporting events, movies, shows, or otherwise along with messages regarding the media.

Figure 1:
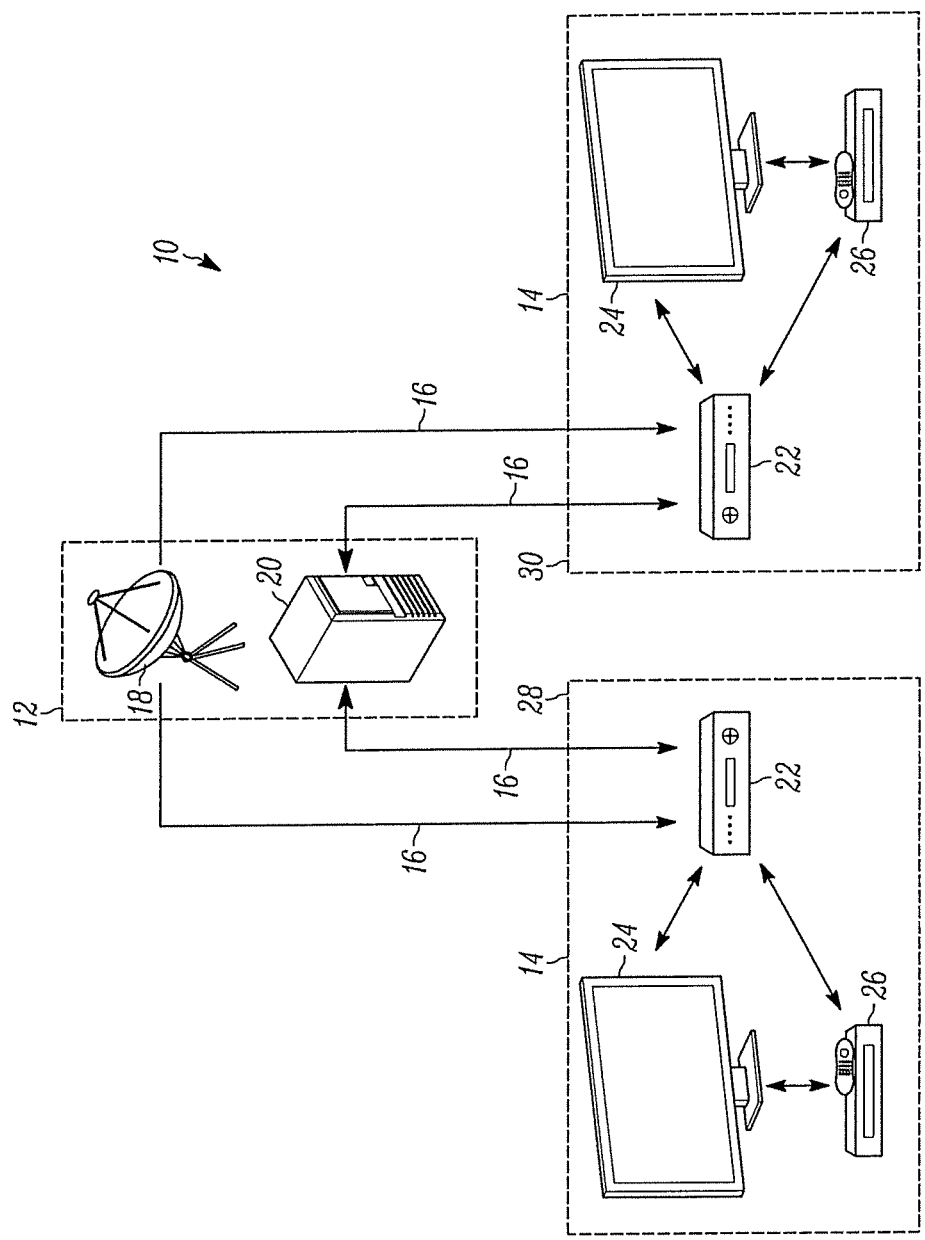
FIG. 1 illustrate a schematic view of a media sharing and communication system according to the teachings of the present invention.

Referring to FIG. 1, an exemplary embodiment of a media sharing and communication system 10 is shown. The system 10 includes a media content provider 12 configured to provide media content to a plurality of user systems 14 over one or more networks 16. The system 10 includes a transmitter 18 configured to transmit media, particularly media programming, to the user systems 14 over the one or more networks 16. The system 10 further includes a receiver 20 configured to receive media, or media information including identification information, from the user systems 14, over the one or more networks 16. The plurality of user systems 14 are configured to receive media, such as television programming, from the media content provider 12. In one exemplary embodiment, the user systems 14 include a user transmitter/receiver 22, in communication with the media content provider, a display screen 24 for viewing media content received by the user transmitter/receiver, and in one particular exemplary embodiment a digital recording device 26 for recording digital information received by the transmitter/receiver 18. In one particular configuration, the user transmitter/receiver 22 is further configured for transmitting data stored by the digital recording device 26.

In one exemplary mode of operation, digital media is transmitted or streamed by the media content provider 12 to the plurality of user systems 14. The media transmitted by the media content provider 12 may comprise any media transmitted by a network including programming shows, movies, sporting events, or otherwise. The transmitted media is received by the user systems 14 through the one or more networks 16. The media received by the user transmitter/receiver 22 is further transmitted to the display screen 24 for viewing. During viewing, once the individual user of the user system 14 determines they wish to share media content, the digital recording device 26 is activated to record the desired media or record information pertaining to the desired media. The media can also be stored and saved on non-transitory computer readable medium on the digital recording device 26 for sharing at a later time by the user or for the user's own personal reasons such as re-watching media or posting to their profile or social media to promote dialogues about certain scenes or products. The digital recording device 26 can also copy the media for storage for a limited time instead of recording. The individual user of the user system 14 generates a message (which can be a text message, a voice commentary message, information related to the location of the media, or combinations thereof) and the recorded media or record information pertaining to the desired media along with the message is then transmitted to another user system 14 (i.e. a second user system 14), via the network 16, through the user transmitter/receiver 22. It should be understood that text messages can include emojis. Messages can also include image files, such as memes, gifs, stickers, or other files. Messages can include text or drawing markups in the media itself (such as with an annotating/markup program for photos or drawings), such as pointing out an item in a scene, showing a sports play, or ways to emphasize any other particular moment in the media. Dissemination of media from one user system 14 to another user system 14 may be based upon selection by an individual user of the first user system 14, based upon user profile set up by an individual user of the first or second user system 14, or otherwise. In other words, the media can be selectively distributed to individual users based on their preferences, including an indication of desired media content. Once the recorded media or media information is received by the second user system 14, the second individual user selectively reviews the message and views the media. In case the first individual user does not send a message along with the portion of media, the second individual user can initiate dialogue with the first individual user and send a message to the first individual user. For example, if the first individual user sends a clip from a TV show without a message, and the second individual user is confused as to why they received the clip, they can send a message to the first individual user to ask them why the clip was sent. The first individual user can send messages either to a second individual user alone, or to a group of individual users that the first individual user can select to share the message with. When sent to a group, this functions as a group chat.

In greater detail, with reference to FIGS. 1-4, the media content provider 12 is configured for disseminating media to a plurality of user systems 14. In one exemplary embodiment, the media content provider 12 comprises a cable television provider, satellite television provider, online movie or other media provider, a media provider through applications on a smartphone or tablet, or otherwise. The media content provider 12 provides assortment of media including audio/visual media, identification information or otherwise. The media provides one or more, or plurality of programming for the user systems 14. Examples of programming available through the media, without limitation, includes movies, network programming, sporting events, concerts, online games, or otherwise. The media disseminated to the user systems 14 may be streamed through or stored on local hard drive of the media content provider 12 or be accessible through a cloud.

The transmitter 18 of the media content provider 12 is configured to disseminate media to a plurality of user systems 14 over one or more networks 16. In one configuration, the network comprises a hardwired network, such as a cable network extending from the media content provider 12 to the user systems 14. In another configuration, the network comprises or includes a wireless network configured for broadcasting signals through radio waves or otherwise. In the latter configuration the media content provider 12 includes a satellite dish or other means for broadcasting media. It is contemplated that the media disseminated from the media content provider 12 may be streamed through the media content provider or stored on one or more digital recording device. Any user transmitter 18 or receiver 20 can include wireless communication links for receiving media and media content providers 12 can disseminate media through wireless communication links.

The receiver 20 of the media content provider is configured to receive information from the user systems 14. In one configuration, the receiver 20 records data transmitted by the user systems including media, program information, both or otherwise. Accordingly, in view of the many potential user systems 14, it is contemplated that the receiver 20 includes many data storage devices. In another configuration, the receiver 20 is further configured for transmitting the received or recorded media to another user system 14, according to a request by the originating user system 14.

Figure 2:
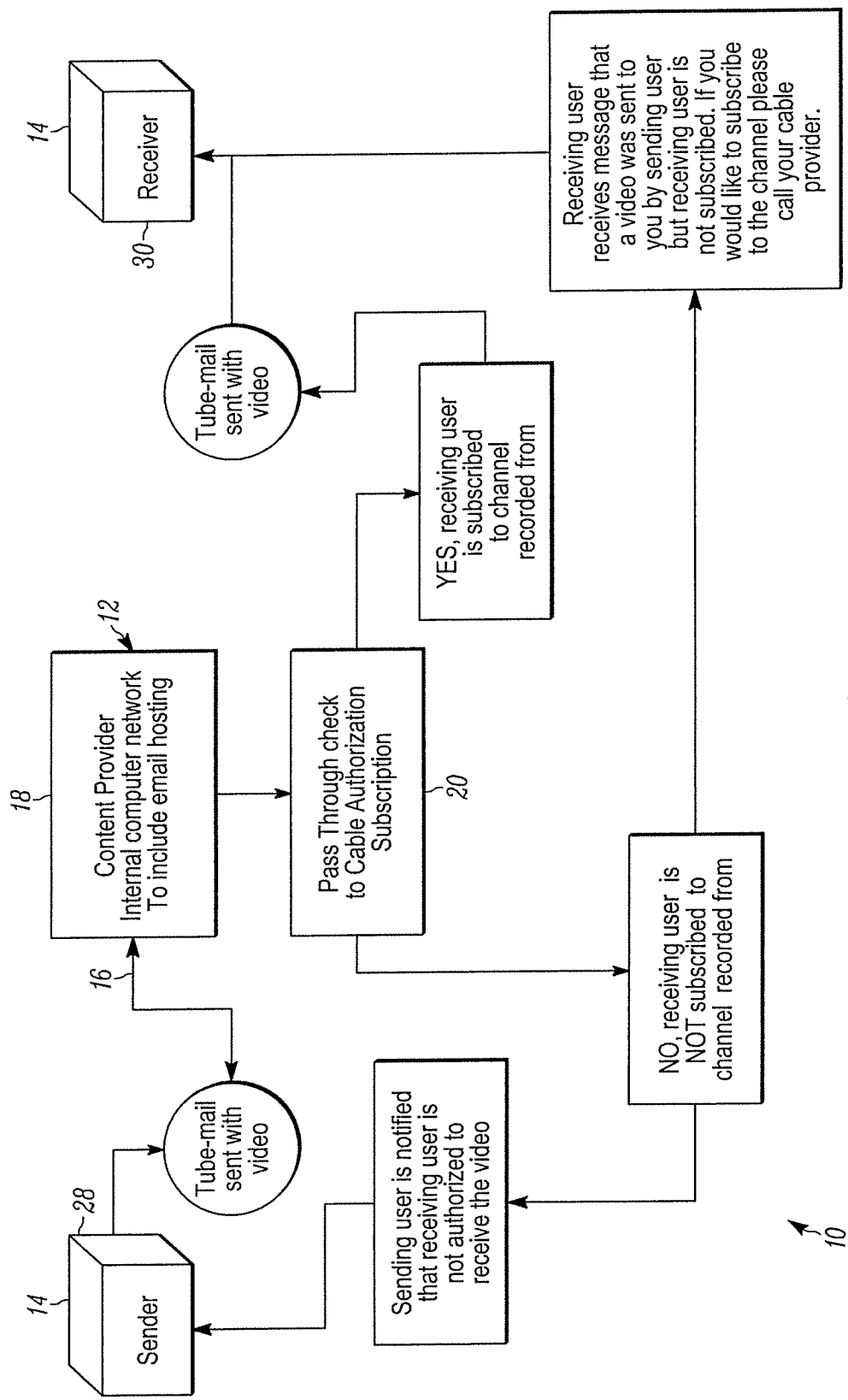
FIG. 2 illustrates a schematic view of another media sharing and communication system according to the teachings of the present invention.
Figure 3:
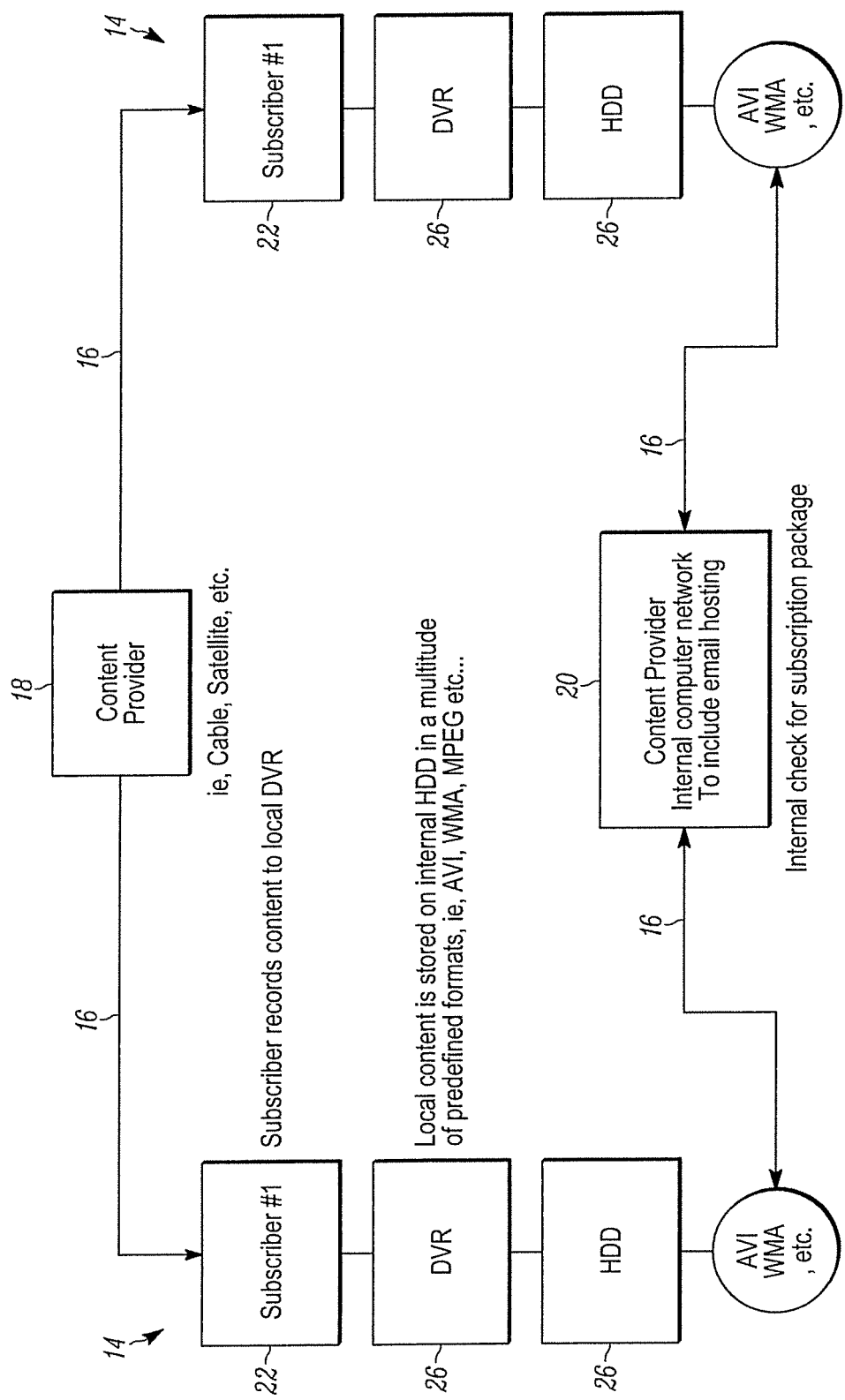
FIG. 3 illustrates a schematic view of another media sharing and communication system according to the teachings of the present invention.
Figure 4:
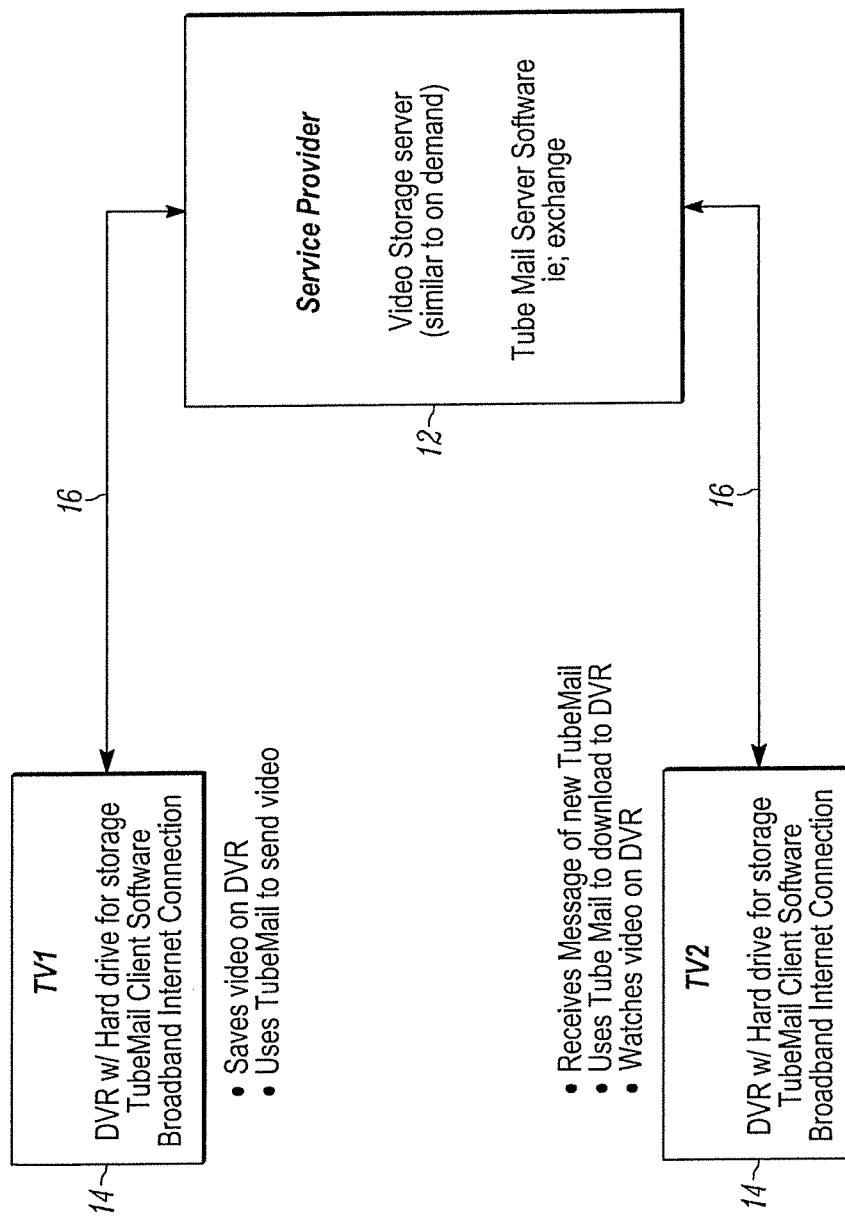
FIG. 4 illustrates a schematic view of another media sharing and communication system according to the teachings of the present invention.

In one particular exemplary embodiment, referring to FIG. 2, the receiver 20 is configured with suitable software for reviewing media transmitted by a user system. In this configuration, it is possible for the receiver 20 to review the identification information of the media transmitted by a first user system 28 and confirm that a designated second user system 30 is authorized to receive the media. In this configuration, the receiver 20 confirms that the media transmitted by the first user system 28 is viewable by the second user system 30 through the viewing package held by the second user system. For example, should the first user system 28 transmit media from a first channel the receiver 20 confirms that the second user system 30 is authorized to view media on the first channel. Should the programming subscribed by the second user system 30 include the first channel then the second user system is authorized to receive and view the media along with any communication attached therewith. Should the programming purchased by the second user system 30 not include the first channel then the second user system is notified that media could not be received due to programming configuration subscribed by the second user. Also, the first user system 28 is notified that the second user system 30 is not authorized to receive the media due to programming subscription of the second user system. The authorization of the second user system 30 can also be automatic or not needed if all users are subscribed to a particular streaming service or channel that automatically allows them access to content therein.

Referring again to FIG. 1, the user system 14, e.g. first user system 28, second user system 30 or otherwise, include the user transmitter/receiver 22, which is configured to receive media from the media content provider 12 and in one particular exemplary embodiment transmit media and/or communication to the media content provider 12 and another user system 14. In one exemplary embodiment, the user transmitter/receiver 22 is similar or includes a cable box, satellite receiver or similar devise commonly used to receive broadcasted digital programming. It should be appreciated that the transmitter/receiver 22 may comprise a single unit or several units. The user transmitter/receiver 22 can also be a suitable mechanism for receiving data within a smartphone or tablet.

The user system 14 further include display screen 24 configured to display media received by the user transmitter/receiver 22. The display screen comprises any suitable display screen including standard definition televisions, high definition televisions, monitors or otherwise. The display screen 24 is in communication with the transmitter/receiver 22 through suitable connecting cables or otherwise. The user systems 14 further includes digital recording device 26 configured to record media received by the user transmitter/receiver 22. Examples of suitable digital recording devices 26 includes DVRs or otherwise. The digital recording device 26 is in communication with the transmitter/receiver 22 through suitable connecting cables or otherwise.

Referring to FIGS. 1 and 5, the user systems 14 further include suitable software for generation of a user interface 32 that is useable with a remote keypad, mouse and/or other user interface devices (smart phones, tablets, or other portable devices). A smart phone or tablet can also be used as a remote control (to allow for easier messaging and use of emojis and general use of the user interface 32) in combination with a television or larger computer screen. In one exemplary embodiment, the suitable software for generating the user interface 32 is stored on a memory device of the user transmitter/receiver 22. In the configuration shown in FIG. 5, the user interface 32 provides means for composing messages (whether text, video, or voice) and attaching media segments, e.g. audio, video and/or identification information, to the composed message. A quick share button can be included in the user interface 32 that provides instant recording of media with options of length of time of 5 seconds, 10 seconds, 15 seconds, 30 seconds, 1 minute, 5 minutes, as well as any other desired length of time. The completed communication is then sendable to other user systems 14. An instant messaging exchange can be located across the bottom of the user interface 32. In the configuration shown, the user interface 32 includes a 'FRIENDS' section indicating users of other user systems 14. The user interface 32 further includes 'NEW', 'REPLY' and 'FORWARD' icons for creating, responding and forwarding communications, which may include media. The user interface 32 further includes 'INBOX' section listing communication received from other user systems 14 including 'FROM', communication or media 'SUBJECT', date 'RECIEVED', and file 'SIZE' In one exemplary embodiment, the user interface 32 includes 'Banner Add Space' for displaying relevant marketing or advertising to the user of the user system, which may be based upon a user profile (including age, gender, location, interests such as favorite television shows, actresses or actors, sport teams, soap operas, musician, band, celebrity commercials or otherwise), transmitted or received media and/or communication, or otherwise.

The user interface 32 can also include a store section wherein users can shop for products directly from their user system 14. The store section can be easily accessible through a shop button or icon on the user interface 32. A banner or separate section can also run along the bottom of the user interface 32 or at the side where products can be displayed while playing media. The store section can include products that are directly advertised to the user as above, or products that may be of interest to the user based on their user profile (i.e. targeted to the user based on things that they like or are following their profile). The store section can include links to products on outside websites, such that when the user clicks on the item, they are directed to an outside website to complete the purchase. The store section can also receive meta data (or other data tagged with information) from media that the user is watching that generates links to products shown in the media so that the user can purchase the products. The media can automatically push this data to the user system 14. Items can be tagged with a software program similar to facial recognition software used by FACEBOOK®. Any item within the media can be recognized with the software program and identified as an item available for purchase (such as clothing, jewelry, furniture, décor, makeup and beauty items, toys, and other household items) and that item can be located on a website or store for purchase and the price of the item can be identified. The software program can analyze images within the media for pixel values and gradients to compare to images of items available for sale in order to correctly identify the items. The store section can also allow for users to purchase songs/music that they hear on media and songs can be tagged in the same manner as physical products. The songs can be downloaded individually as mp3 files or other audio files, or the user can purchase an entire album that the song is from. The songs can be synced or downloaded directly to the user's account or to other music platforms such as Apple Music or TIDAL.

For example, if the user is watching "The View", and they like the reading glasses that a co-host is wearing, a link can be generated for those glasses that the user can click on and buy the glasses. The user can pause the media that they are viewing (whether by operating a remote control, mouse, or touchscreen), and options of items for purchase can be presented on the screen either automatically (and include an indication that the item is for sale, such as a graphic display or icon with the name of the item and its price and/or source), or when the user clicks on or moves a mouse over a certain item. The items can be displayed in a banner at the bottom or side of the media without the need to pause. Every item can be displayed for sale in the scene to the user or a single item that the user selects from the display.

Users can also gift products to other users in the system or other individuals outside of the system. For example, users can gift a streaming package or digital gift cards to other users. Gift cards can be added to the other user's user profile for purchasing media content or other products that they desire. Users can also gift products (such as those advertised based on the other user's profile or listed on a "Gift Me" section of the user's profile that is viewable to other users in which the user has liked or selected a particular item that they are interested in having purchased for them) and have them shipped to another user.

Users can also list their own products for sale in the store section to other users, as well as advertise their products to other users and upload their own advertisements or commercials. Users can store their payment (credit card/debit card/banking) information in their profile, along with their address to make transactions within the user system 14 easy and quick. If the user does not complete a transaction on an outside website, users can add items to a shopping cart within the user system 14 and check out with their payment information to have their items delivered. In general, when the user pauses the media, options can pop up on the user interface 32 for recording, sharing, purchasing, or gifting. This allows the user to easily select an option and proceed with what they want to do. The user can click on the item they want to purchase and it can be added to a shopping cart, the payment information can be attached to the user's account and they can purchase the item seamlessly without exiting the viewing platform and then the transaction can be closed.

The store section can also include a mechanism for virtually trying on products including facial recognition software stored on non-transitory computer readable media in electronic communication with a camera on the user system 14 such as from a smartphone, tablet, desktop computer, laptop, gaming system, or other system. The mechanism can display a user's face and/or body on the user interface 32 so that they can virtually try on products that they are interested in buying. The mechanism can also display other items of the user with the camera, such as a room, their house, or their yard or property. For example, the user can try on jewelry, makeup, hair dye, or items of clothing, and the item is shown virtually applied to themselves on the user interface 32. The user can also try out items in their room or yard, such as furniture, décor, or trees or flowers.

In one example with the store section, a user is watching TV and sees a tie that George Clooney is wearing, the user can pause the screen, the option to record, share, or purchase pops up on the screen, the user can select purchase for any item that is tagged for purchase such as the tie, the item goes into their shopping cart, and having payment information attached to the user account allows the user to purchase or gift the tie that they want without exiting the viewing platform. In another example, a child is watching a DISNEY® movie and their parent hears them ask for a Princess Jasmine costume seen in the movie. The parent can pause the screen, select the costume, and purchase it without changing the channel or having to search on another market/platform.

Therefore, the present invention also provides for a shopping interface for purchasing items on media, including the user system 14 having the user interface 32 displaying items for purchase, such that when the media is paused, items for purchase pop up and are displayed on the user interface allowing said user to select an item to purchase, the user system 14 storing user payment and address information on non-transitory computer readable media, the user interface 32 also including a mechanism for virtually trying on products. The items displayed for purchase can also include food and the details of the food ordering module described below can be included in this system.

The present invention also provides for a method of shopping on media, including the steps of a user playing media on the user interface 32 of the user system 14, the user pausing the media, displaying items for purchase, the user selecting an item, the user virtually trying on the item, and the user purchasing the item with stored user payment and address information on non-transitory computer readable media of the user system 14. The items displayed for purchase can also include food and the details of the food ordering module described below can be included in this system.

The user interface 32 can further include a search mechanism that allows individual users to search for media or particular scenes in media as well as products. Media can be searched by users by keywords (such as any identifying information in a particular scene or moment, landmarks, actor name, director name, type of media such as commercial, sports event, movie, or tv program, genre of media (drama, comedy, news, documentary, etc.), or combinations thereof located in the file name, file description, or meta data. If a media file itself has identifying information within scenes, that can be searched. Clips or portions of media can be saved by users (such as individuals, actors, or directors) in their account and can be searchable. For example, a user can search for "Scene in Forest Gump, when Forest runs through water at the National Mall in DC". Any clips/portions returned by the search results can then be selected and shared with other users or edited further (to select a particular scene or moment) and then shared. Actors can also narrate scenes and explain to viewers what was going on in their mind during that scene and provide the scenes as clips for users to share. Media can be searched to find items for users to make purchases (such as clothing, shoes, jewelry, electronics, or home items) that appear in media. For example, a user can search for Ann Hathaway because they like the dress she had on in the movie "The Intern" at a certain scene. The search results can provide a link to purchase or a link to purchase within the store section as above. The search mechanism allows users to find content without having to leave the platform of the user system 14.

The user interface 32 can include a video recording mechanism, wherein users can record a video of themselves and share the video with other users through the user system 14. For example, users can record themselves reenacting scenes from movies, shows, commercials, video games, etc. The video recording mechanism can use sounds from any media (background music or other sounds) to bring reenactments to life. Users can also speak along with their favorite scenes or actors for performing complete in sync voice overs. Users can also create challenges with other users to create reenactments, which promotes social use of the media sharing and communication system 10. Users can also just create a video of themselves and speak about the media that they have viewed and/or shared with other users.

The user interface 32 can include an online betting module that allows users to bet on sports events (such as NBA, NFL, NHL, MLB, NASCAR), or on online games that users play against each other. The online betting module can include an age verification mechanism according to requirements of cities, states, and/or countries. Bets can be placed before or during an event. The online betting module can be easily accessible through a button or icon on the user interface 32.

The user interface 32 can further include an online food ordering module that allows users to order food advertised in commercials or online ads (such as a pizza store, a fast food company, a convenience store), as well as the type of food shown in a media program such as a tv show or movie. For example, a tv show may feature the cast eating at a high end restaurant, and different high end restaurants can be displayed on the user interface as offering online ordering and optionally delivery to the user. A cooking show can feature a particular type of cuisine (such as Chinese, Mexican, Japanese, Indian, Italian, Vietnamese, French, Fusion, Southern, Middle Eastern, Korean, Spanish, Eastern European, etc.), and the user interface can display restaurants of that type of cuisine that offer online ordering and delivery. A user can click on the restaurant and order food for either pick up or delivery. The user interface 32 can interact with existing food ordering/delivery platforms such as Seamless, Grubhub, Uber Eats, Postmates, Yelp, Caviar, DoorDash, and others. The online food ordering module can also be easily accessible through a button or icon on the user interface 32. A user can also gift food and delivery to another user and addresses of other users (contacts) can be stored in the user system 14 to easily send these items to another user. As with the store section, the online food ordering module can use a software program to identify and tag food items for purchase. Any food item within the media can be recognized with the software program and identified as an item available for purchase and that item can be located at a restaurant or delivery platform for purchase. The software program can analyze images within the media for pixel values and gradients to compare to images of food items available for sale in order to correctly identify the food items.

In one exemplary embodiment the user system 14 includes suitable software and user interface 32 for generating a user profile and attract other users or followers from social networks such as FACEBOOK®, TWITTER®, or otherwise, based upon the type of programming the user views. The user profile includes information of an individual user of the user system 14 to provide an indication of personal preference. For example, information that can be inputted into the user interface includes types of media, e.g. audio, video or identification information that a user enjoys. Other user preferences includes programming likes and dislikes including sports, movies, programming, celebrities, commercials, games, or otherwise. Other user preferences are possible. Users can also like or love any media, and this can be visible on their user profile and/or visible to other users or friends.

In greater detail, in one exemplary embodiment, the user profile provides the ability to indicate special interests. In one particular configuration, the user profile is used to generate suggested viewing. The user profile provides the ability of a user to indicate particular interests which may include a particular actor, athlete, programming type or otherwise. Based upon the user profile, the media sharing and communication system 10 generates a listing of program based upon the user programming, which may include similar interest such as indicated actors, athletes, programming type or otherwise. Traditional methods require the user to search for something and then they begin to see advertisements directed towards their search. The present invention reverses this process.

For example, should the user profile indicate a favorite baseball player and the particular baseball player is participating in an interview on one programming channel, such as a finance channel, the system 10 would indicate to the user that a player indicated in their user profile is on a particular channel providing the ability of the user to watch or record the particular programming. This concept can also be applied to actors, movie types, sports, other players, automobile manufactures or otherwise.

The user profile as visible in user interface 32 can further include tabs for trending news, sports, products, or clips of media. The user can add particular news sources, sports teams, or products they are interested in, and/or these can be generated based on information in the user profile. Users can also receive news updates based on their interests and preferences (such as finance, sports, local, etc.).

User profiles can also be tailored to a particular age group, such as for kids, with tailored advertising and suggested media suitable for a particular age group.

The communication system 10 provides socialization between users. The individual user of the user system 14 can send and receive a friend request, which must be approved by the recipient (i.e. second user system 14), in order to be added to the friend list and receive media. The communication system 10 is further configured to suggest friends or other users that have similar interest so that media can be sent to individuals, of a user profile friend list, that has similar interests. The communication system 10 further provides the ability to set up a notification that will notify a user when other users are online or offline. The individual user can also have an open profile option that allows anyone to follow them or send media, promoting community and meeting new people. A user can search for friends by name, username, gamer tag, telephone, address, or email that have been used in setting up a user profile.

In one particular exemplary embodiment, the user system 14 is integrated in hardware and/or software components of a cellular phone, i.e. smartphone, or tablet and is accessible to the user in the form of an application stored on non-transitory computer readable media or stored in a cloud. For example, the transmitter/receiver 22 comprises a transmitter/receiver 22 used in cellular phones for cellular communication. The display screen 24 comprises a screen and user interface of the cellular phone. Further, the cellular phone includes a digital recording device comprising a memory module for recording media, generating user interfaces, generating messages, combinations thereof or otherwise.

In one particular mode of operation, referring again to FIGS. 1-5, during viewing of media being disseminated from the media content provider 12, should the viewer find a particular media content of interest, the user records and initiates the user interface 32 to select other users to which to share the media content with. Optionally, the user includes a message with the recorded media, such as "check this out", "did you see that play", "best part of the movie", or otherwise. The recorded media and message is sent to another user system 14, through the media content provider 12 and more specifically receiver 20. Should the recipient be authorized to receive the media and have sufficient memory, the message and media is transferred to the second user system 14. A user can also send a message to a second user about recommended programming that the second user may like.

Any commands within the user system 14 can be actuated (received and executed) through the voice of the individual users. For example, the individual user can use a voice command to rewind media, fast forward media, record media, add a message to the recorded media, and send the media and/or message to another user, as well as make purchases in the store section, use the online food ordering module (ordering or searching for food), use the betting module (placing and confirming bets), and gift items. Any of the commands can be actuated for a set amount of time determined by the user (such as by seconds (5 seconds, 10 seconds, 25 seconds) or minutes (1 minute, 5 minutes, 10 minutes)) at the time the voice command is given. For example, the individual user can command "Rewind by 10 seconds and record for 25 seconds. Send to Joe." The individual user can command "purchase the red hat and send to Sheryl".

In particular, when the message is a voice commentary, this allows the users (whether sending or receiving) to narrate clips or portions of media and to have open dialogue about particular clips of interest. This can allow the user the opportunity to act as a news anchor or sports commentator. Voice commentary allows the user to express with great detail what that media portion means to them along with why they decided to send it to a particular user. This can enhance the television viewing experience with friends and family when users are in two different households, and gives the user an opportunity to explain to the other user why they feel they should or should not like a show, actor, sports team, etc. With the voice commentary, the user can also talk over a desired portion of media, much like a sports commentator or news anchor, and narrate the portion of media and add humor to it or dramatize it more. The user can also add music over the portion of media.

The present invention creates excitement for the user when a user turns on their user system 14 and is notified that they have messages in their INBOX from friends and family as in FIG. 5. The present invention helps reduce channel surfing, because when a user turns on their user system 14, they have suggested media to review from their INBOX, as well as suggestions for media to view based on their likes and interests from their user profile, such as an actress they like is on a talk show at a certain time, a particular category of media (action, architecture, sports, animals, drama), or their favorite sports team is playing on a particular channel. Also, the user system 14 can allow for individual users to see what their friends are watching, and they can be notified either in their INBOX or on their display screen 24. This can promote group watching where the individual user can start watching a program along with their friend or group of friends.

Users can further send messages to other users without a media file attached with it. For example, a user can send another user a reminder that a program they like was on earlier, or simply send messages not related to media files such as greetings to another user. Users can also message each other while watching a live program, and this provides users the ability to watch a program together while being in different locations. Messages can pop up on their display screen 24 of their user system 14 or go directly to their INBOX while watching a live program.

The present invention also provides for a method of sharing portions of media and watching a live program, by a first individual user recording a portion of media and recording a message (such as video, text, voice, or combinations thereof), transmitting the portion of media and message to a second individual user if the second individual user is authorized to view the portion of media, the second individual user viewing the portion of media and message, the first individual user recording a message during a live program and transmitting the message to the second individual user, and the second individual user recording a message during the live program and transmitting the message to the first individual user. This method can be performed by using the media sharing and communications system 10 described above. More particularly, the recording step is further defined as the first individual user recording a portion of media with a recording mechanism 26 in a first user system 14, the transmitting step is further defined as transmitting the portion of media and message with a first user transmitter/receiver 22 to a second user transmitter/receiver 22, and the viewing step is further defined as a second individual user viewing the portion of media and message with a second user system 14. Any notifications described above can be sent to the first individual user or second individual user, such as notifying the first individual user if the second individual user is not authorized to view the portion of media. The users can create user profiles and the user systems 14 can generate suggested programming based on the user profile. The method can further include notifying the first (or second) individual user of messages in an inbox and suggestions of programming when the first (or second) user system 14 is turned on. The users can also shop in the store section of the user system 14 or list products for sale. The users can place an online bet with the online betting module. The users can order food with the online food ordering module. The first individual user can also record a video of themselves and share the video with the second individual user as described above. While watching the live programming, any users can also live stream a video of themselves to share with other users in the group watching the media on their user interfaces 32. The streaming videos can appear to the side of the media being watched or be minimized when desired.

The present invention also provides for method of sharing media by a first individual user searching for media of program information, programming shows, movies, concerts, sporting events, online games, or commercials by keywords and selecting a portion of media returned in search results, the first individual user recording a message of video, text, voice, emojis, images, or combinations thereof, transmitting the portion of media and message to a second individual user if the second individual user is authorized to view the portion of media, and the second individual user viewing the portion of media and message. The searching step is performed with the searching mechanism as described above. The first individual user can also record a video of themselves and share the video with the second individual user as described above.

The present invention also generally provides for a method of sharing portions of media, by a first individual user recording a portion of media and recording a message chosen from the group consisting of video, text, voice, and combinations thereof, transmitting the portion of media and message to a second individual user if the second individual user is authorized to view the portion of media, the second individual user viewing the portion of media and message, the first individual user recording a message and transmitting the message to the second individual user, and the second individual user recording a message and transmitting the message to the first individual user, wherein any of the steps are performed by a voice command. The first individual user can also record a video of themselves and share the video with the second individual user as described above.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A media sharing and communication system, comprising:
   a recording mechanism that records a desired portion of media upon activation by a first individual user who is not a content provider, the portion of media being less than a full media episode;
   a friend request mechanism for sending and receiving friend requests between users to be approved to receive and share media and wherein the friend request mechanism suggests friends who have similar interests of the first individual user, and wherein the friends are searchable by information chosen from the group consisting of name, user name, gamer tag, telephone, address, and email;
   a first user transmitter/receiver included in a first user system that transmits the portion of media and a message generated by the first individual user regarding the portion of media to a second individual user who is not a content provider, the first user system including a first user interface having an input device and screen view that is generated by software stored on a memory device of the first user transmitter/receiver, the first user system including a user profile generator interface and a store section for shopping for products and listing products for sale, wherein said store section includes software that recognizes and tags items available to purchase in said media by analyzing images within the media for pixel values and gradients to compare to images of items available for sale in order to correctly identify the items, and wherein the store section allows for gifting products to other users and a mechanism for virtually trying on products, wherein the store section includes facial recognition software stored on non-transitory computer readable media in electronic communication with a camera on the first user system, and wherein the mechanism for virtually trying on products displays products on the first individual user's face, on the first individual user's body, in the first individual user's room, and on the first individual user's property;
   a confirmation mechanism that confirms that the second individual user is authorized to view the portion of media and a notification mechanism that notifies the first individual user if the second individual user is not authorized to receive the portion of media and notifies the second individual user that the portion of media cannot be received due to programming configuration subscribed to by the second individual user;
   a second user transmitter/receiver included in a second user system that receives the portion of media upon authorization of the second individual user; the second user system including a second user interface having an input device and screen view that is generated by software stored on a memory device of the second user transmitter/receiver, the second user system including a user profile generator interface and a store section for shopping for products and listing products for sale, wherein said store section includes software that recognizes and tags items available to purchase in said media by analyzing images within the media for pixel values and gradients to compare to images of items available for sale in order to correctly identify the items, and wherein the store section allows for gifting products to other users and a mechanism for virtually trying on products, wherein the store section includes facial recognition software stored on non-transitory computer readable media in electronic communication with a camera on the second user system, and wherein the mechanism for virtually trying on products displays products on the second individual user's face, on the second individual user's body, in the second individual user's room, and on the second individual user's property;
   a search mechanism that allows the first individual user and second individual user to search by keywords for media and products used in media;
   a video recording mechanism that allows the first individual user to record a video of themselves and share the video with the second individual user;
   an online betting module that allows the first individual user to place bets on sporting events and online games, and wherein a bet can be placed before or during the sporting events and online games, and including an age verification mechanism; and
   an online food ordering module that allows the first individual user to order food from food advertised in a commercial, food advertised in an online ad, and food shown in a media program, wherein the online food ordering module interacts with an existing food ordering and delivery platform, wherein the first individual user can gift food and delivery to another user, and wherein said online food ordering module includes software that recognizes and tags food available to order in said media by analyzing images within the media for pixel values and gradients to compare to images of food items available for sale in order to correctly identify the food items.

2. The media sharing and communication system of claim 1, wherein said first user interface further includes a quick share button that allows for instant recording of media for a length of time chosen from the group consisting of 5 seconds, 10 seconds, 15 seconds, 30 seconds, 1 minute, and 5 minutes.

3. The media sharing and communication system of claim 1, wherein the first user system and second user system are capable of receiving and executing voice commands chosen from the group consisting of rewinding media, fast forwarding media, recording media, adding a message to recorded media, and sending media and/or a message.

4. The media sharing and communication system of claim 1, wherein said first user system and said second user system are integrated in a smartphone or tablet and are accessible by using an application stored on non-transitory computer readable media.

5. The media sharing and communication system of claim 1, wherein the media is chosen from the group consisting of program information, programming shows, movies, concerts, sporting events, online games, virtual reality, preset blocks of media, and commercials.

6. The media sharing and communication system of claim 1, wherein the second user transmitter/receiver includes a recording mechanism that records a desired portion of media upon activation by the second individual user and can transmit the portion of media to the first individual user.

7. The media sharing and communication system of claim 1, wherein the first user interface transmits the portion of media to the second user transmitter/receiver based upon a profile established through a user interface of the second user transmitter/receiver.

8. The media sharing and communication system of claim 7, wherein the profile comprises select program or program type disseminated by a media content provider and personal information of the user of the first user transmitter/receiver.

9. The media sharing and communication system of claim 8, wherein the personal information includes payment information.

10. The media sharing and communication system of claim 1, wherein the first user transmitter/receiver automatically records media disseminated by the media content provider based upon preferences entered into a user profile of the first user transmitter/receiver.

11. The media sharing and communication system of claim 1, wherein the notification mechanism notifies the first individual user, the second individual user, or both, if the second user transmitter/receiver does not have sufficient memory to receive the portion of media.

12. The media sharing and communication system of claim 1, wherein the message is chosen from the group consisting of text, voice, video, emojis, text and drawing markups in the media, and images.

13. The media sharing and communication system of claim 1, wherein the products are chosen from the group consisting of product directly advertised to the first individual user, products based on a user profile, products shown in media, songs heard in media, and combinations thereof.

14. A method of sharing portions of media, including the steps of:
- a first individual user recording a portion of media and recording a message chosen from the group consisting of video, text, voice, emojis, text and drawing markups of the media, images, and combinations thereof with a first user interface on a first user system;
- transmitting the portion of media and message to a second individual user if the second individual user is authorized to view the portion of media;
- the second individual user viewing the portion of media and message with a second user interface on a second user system;
- the first individual user placing a bet on a sporting event or online game with an online betting module on the first user interface, wherein the online betting module allows a bet to be placed before or during the sporting event and online game, and includes an age verification mechanism;
- software in a store section in the first user interface recognizing and tagging items available to purchase in the media by analyzing images within the media for pixel values and gradients to compare to images of items available for sale in order to correctly identify the items;
- the first individual user shopping for available products from the store section and virtually trying on products by displaying products on the first individual user's face, on the first individual user's body, in the first individual user's room, and on the first individual user's property, wherein the store section includes facial recognition software stored on non-transitory computer readable media in electronic communication with a camera on the first user system;
- software in an online food ordering module in the first user interface recognizing and tagging food available to order in the media by analyzing images within the media for pixel values and gradients to compare to images of food items available for sale in order to correctly identify the food items; and
- the first individual user ordering food with the online food ordering module on the first user interface, wherein the online food ordering module allows the first individual user to order food from food advertised in a commercial, food advertised in an online ad, and food shown in a media program, wherein the online food ordering module interacts with an existing food ordering and delivery platform, and wherein the first individual user can gift food and delivery to another user.

15. The method of claim 14, further including the step of the first individual user recording a video of themselves and sharing the video with the second individual user.

16. The method of claim 14, wherein each of the steps are performed using an application on a smartphone or tablet stored on non-transitory computer media.

17. The method of claim 14, further including before said first individual user recording a portion of media step, the step of the first individual user searching for media chosen from the group consisting of program information, programming shows, movies, concerts, sporting events, online games, and commercials by keywords and selecting a portion of media returned in search results.

18. The method of claim 14, further including the step of the first individual user searching for a product in media and purchasing the product through the first user interface.

19. The method of claim 14, wherein said recording step is further defined as the first individual user recording a portion of media with a recording mechanism in the first user system, wherein said transmitting step is further defined as transmitting the portion of media and message with a first user transmitter/receiver to a second user transmitter/receiver, and wherein said viewing step is further defined as a second individual user viewing the portion of media and message with the second user system.

20. The method of claim 14, further including the step of notifying the first individual user if the second individual user is not authorized to view the portion of media.

21. The method of claim 14, further including the step of the first individual user creating a user profile, and the first user system generating suggested programming based on the user profile.

22. The method of claim 14, further including the step of notifying the first individual user of messages in an inbox and suggestions of programming when the first user system is turned on and notifying the first individual user that a friend is watching a program.

23. The method of claim 14, further including the step of the first individual user shopping for products from the first user interface chosen from the group consisting of product directly advertised to the first individual user, products based on a user profile, and combinations thereof.

24. The method of claim 14, further including the step of the first individual user listing products for sale on the first user interface.

25. The method of claim 14, wherein the step of a first individual user recording a portion of media is performed with a quick share button that allows for instant recording of media for a length of time chosen from the group consisting of 5 seconds, 10 seconds, 15 seconds, 30 seconds, 1 minute, and 5 minutes.

26. The method of claim 14, wherein said step of the first individual user shopping for available products from the store section further includes the step of gifting products to an individual.

27. A media sharing and communication system, consisting of:
- a recording mechanism that records a desired portion of media upon activation by a first individual user who is not a content provider, the portion of media being less than a full media episode;
- a friend request mechanism for sending and receiving friend requests between users to be approved to receive and share media and wherein the friend request mechanism suggests friends who have similar interests of the first individual user and wherein the friends are searchable by information chosen from the group consisting of name, user name, gamer tag, telephone, address, and email;

a first user transmitter/receiver included in a first user system that transmits the portion of media and a message generated by the first individual user regarding the portion of media to a group of individual users who are not content providers, the first user system including a first user interface having an input device and screen view that is generated by software stored on a memory device of the first user transmitter/receiver, the first user system including a user profile generator interface and a store section for shopping for products and listing products for sale, wherein said store section includes software that recognizes and tags items available to purchase in said media by analyzing images within the media for pixel values and gradients to compare to images of items available for sale in order to correctly identify the items, and wherein the store section allows for gifting products to other users and a mechanism for virtually trying on products, wherein the store section includes facial recognition software stored on non-transitory computer readable media in electronic communication with a camera on the first user system, and wherein the mechanism for virtually trying on products displays products on the first individual user's face, on the first individual user's body, in the first individual user's room, and on the first individual user's property;

a confirmation mechanism that confirms that the group of individual users are authorized to view the portion of media and a notification mechanism that notifies the first individual user if any one of the group of individual users is not authorized to receive the portion of media and notifies the one of the group of individual users that the portion of media cannot be received due to programming configuration subscribed to by the one of the group of individual users;

a plurality of user transmitter/receivers included in a plurality of user systems that receive the portion of media upon authorization of the group of individual users; the plurality of user systems including a plurality of user interfaces having an input device and screen view that is generated by software stored on a memory device of the plurality of user transmitter/receivers, the plurality of user systems including a user profile generator interface and a store section for shopping for products and listing products for sale, wherein said store section includes software that recognizes and tags items available to purchase in said media by analyzing images within the media for pixel values and gradients to compare to images of items available for sale in order to correctly identify the items, and wherein the store section allows for gifting products to other users and a mechanism for virtually trying on products wherein the store section includes facial recognition software stored on non-transitory computer readable media in electronic communication with a camera on the plurality of user systems, and wherein the mechanism for virtually trying on products displays products on the plurality of individual user's faces, on the plurality of individual user's bodies, in the plurality of individual user's rooms, and on the plurality of individual user's properties;

a search mechanism that allows the first individual user and plurality of individual users to search by keywords for media and products used in media;

a video recording mechanism that allows the first individual user to record a video of themselves and share the video with the plurality of individual users;

an online betting module that allows the plurality of individual users to place bets on sporting events and online games, and wherein a bet can be placed before or during the sporting events and online games, and including an age verification mechanism; and an online food ordering module that allows the plurality of individual users to order food from food advertised in a commercial, food advertised in an online ad, and food shown in a media program, wherein the online food ordering module interacts with an existing food ordering and delivery platform, wherein the plurality of individual users can gift food and delivery to another user, wherein said online food ordering module includes software that recognizes and tags food available to order in said media by analyzing images within the media for pixel values and gradients to compare to images of food items available for sale in order to correctly identify the food items.

* * * * *